United States Patent
McQuaid

[15] 3,636,227
[45] Jan. 18, 1972

[54] CONTROL SYSTEMS

[72] Inventor: Gerald J. McQuaid, Painted Post, N.Y.
[73] Assignee: Corning Glass Works, Corning, N.Y.
[22] Filed: Oct. 22, 1970
[21] Appl. No.: 82,997

[52] U.S. Cl. .................................................13/6, 13/24
[51] Int. Cl. .................................F27d 11/04, H05b 3/00
[58] Field of Search .........................................13/6, 24

[56] References Cited

UNITED STATES PATENTS

| | | | |
|---|---|---|---|
| 3,047,647 | 7/1962 | Harkins et al. | 13/6 |
| 3,183,294 | 5/1965 | Kasper | 13/24 X |
| 3,524,206 | 8/1970 | Boettner et al. | 13/6 |

Primary Examiner—Bernard A. Gilheany
Assistant Examiner—R. N. Envall, Jr.
Attorney—Clarence R. Patty, Jr. and Ernst H. Ruf

[57] ABSTRACT

Systems for controlling an electric melting furnace containing a bath of molten material acting as a resistance to electric currents passing therethrough; with the systems including first and second control loops for controlling both the level and distribution of energy supplied to first and second position of the bath; a third control loop for controlling the temperature of the bath; and if desired, a further control loop for controlling the energy ratio between the first and second control loops.

10 Claims, 7 Drawing Figures

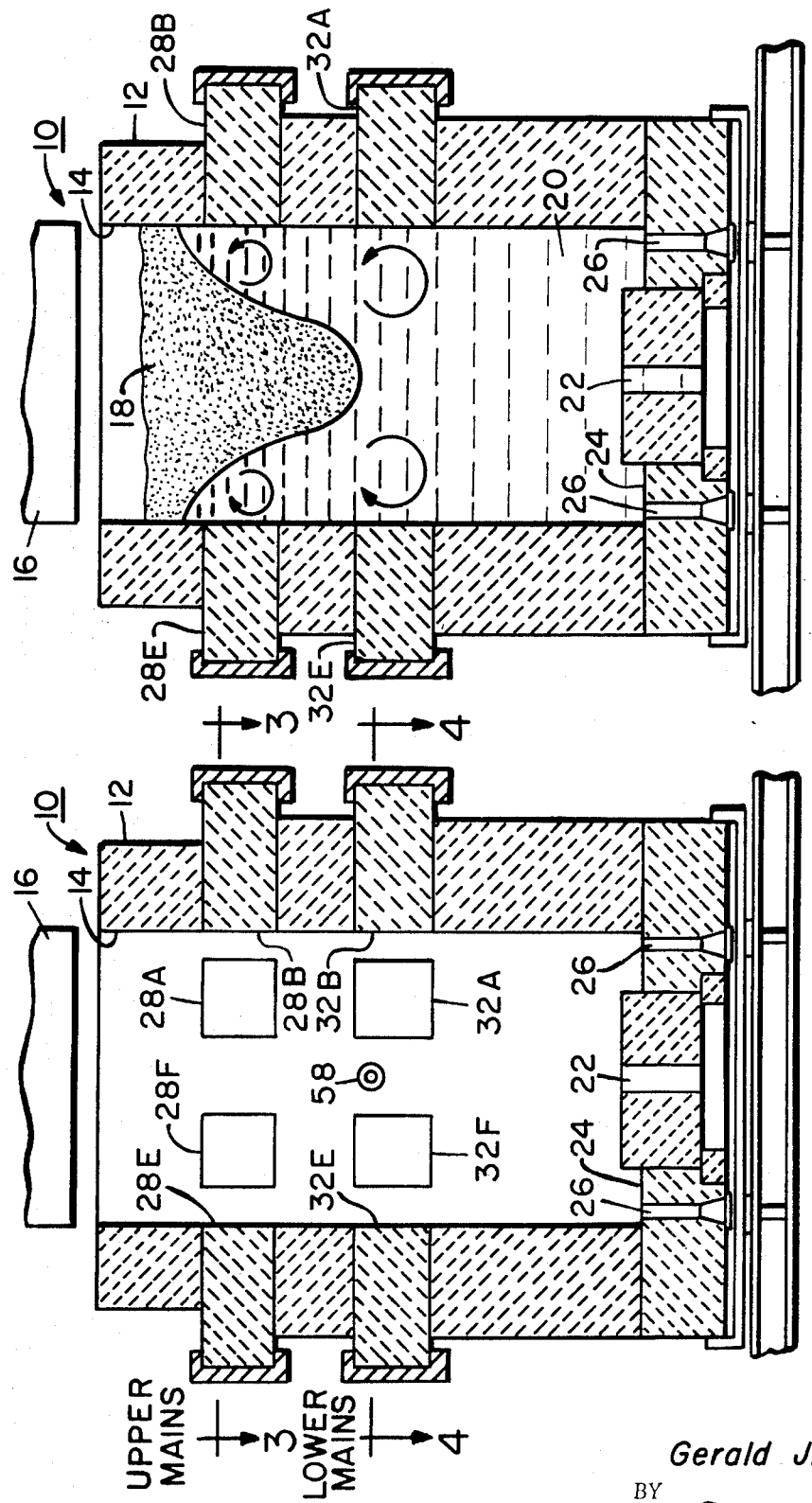

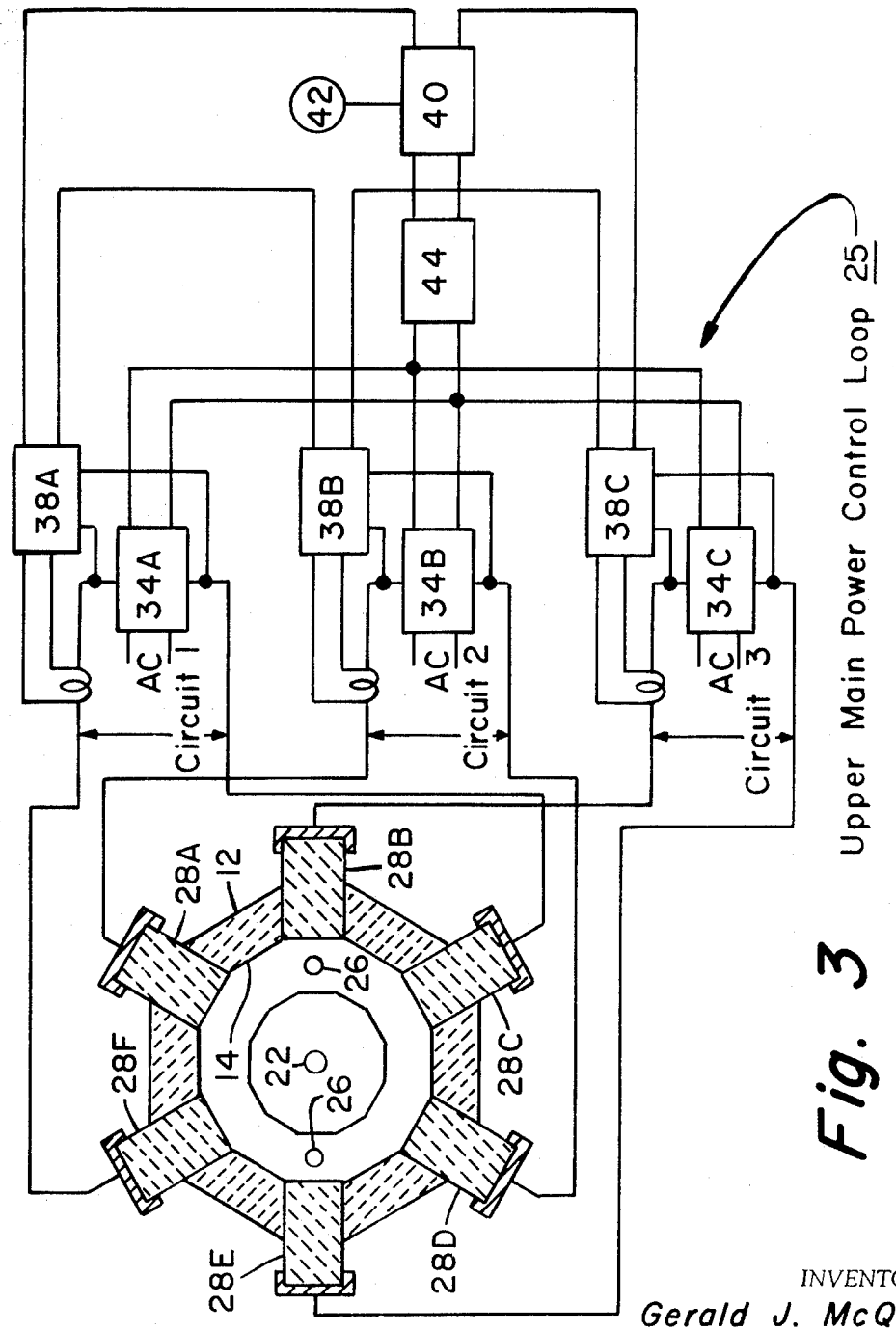
Fig. 3  Upper Main Power Control Loop 25

INVENTOR.
Gerald J. McQuaid
BY
ATTORNEY

Modifier Device

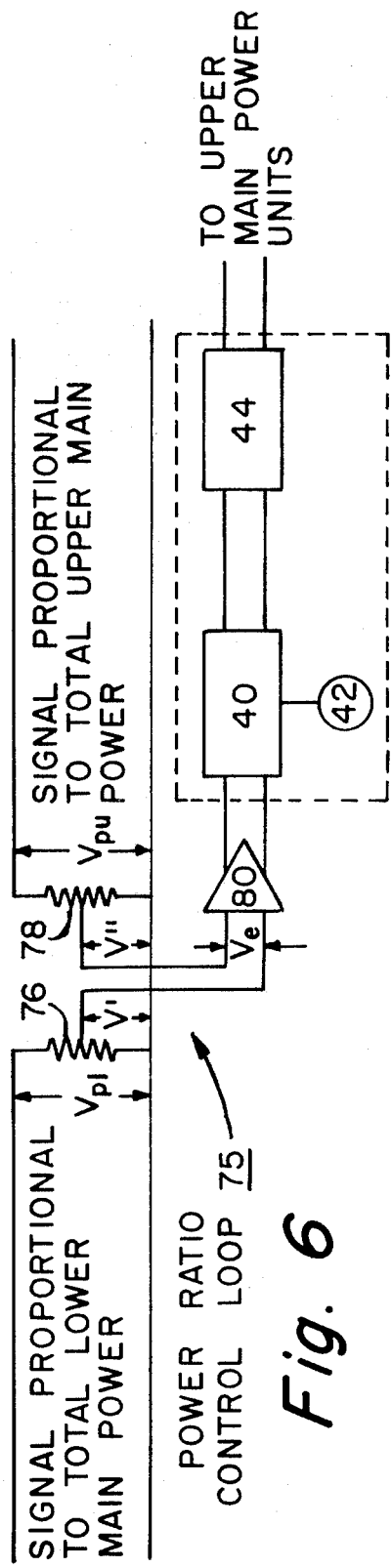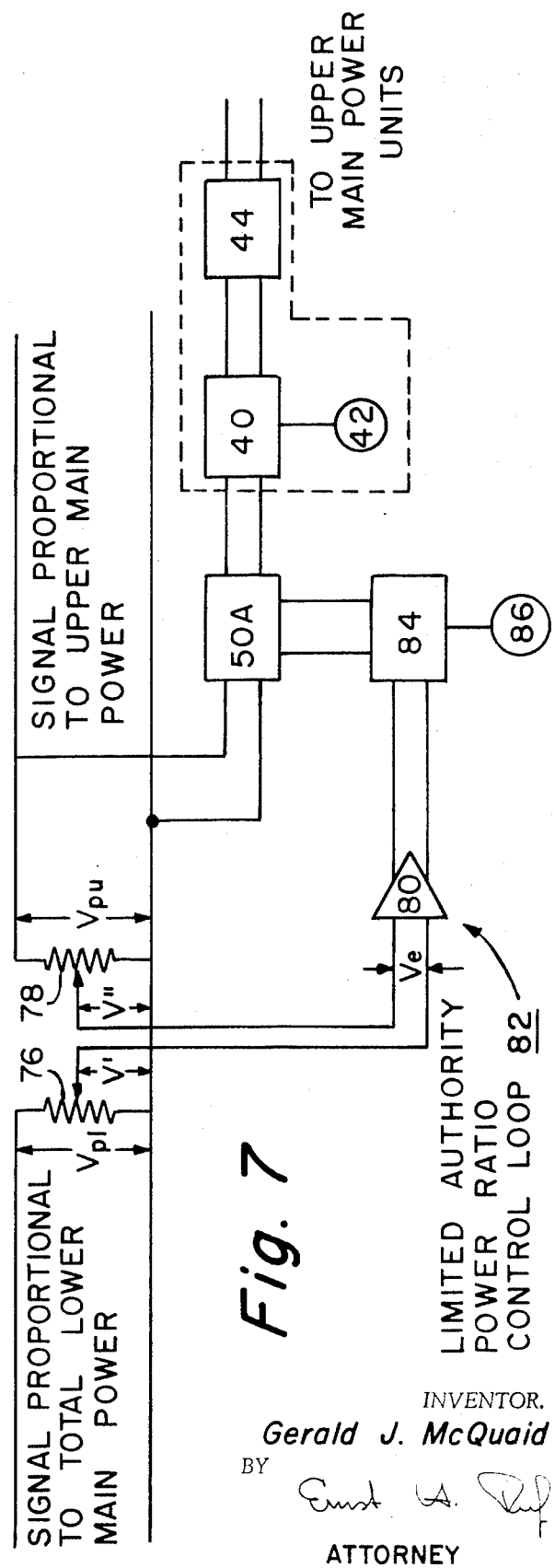

CONTROL SYSTEMS

BACKGROUND OF THE INVENTION

The field to which this invention pertains is that of control systems for furnaces or melting tanks, and more particularly to energy level and distribution as well as temperature control systems for melting furnaces.

The invention is described particularly in connection with the melting of thermoplastic materials in furnace of the type shown and described in U.S. Pat. No. 3,524,206 to Boettner et al. (also assigned to the assignee of this invention), although not restricted thereto. For a more detailed discussion of the mode of operation of the above-referred-to furnace see particularly column 2 lines 37 to 72, column 3, and column 4 lines 1 to 31 of said patent.

SUMMARY OF THE INVENTION

The control systems of this invention utilize a plurality of control loops including:
 a. first and second control loops for controlling both the level and distribution of energy supplied to first and second sets of electrodes, respectively;
 b. a third control loop for controlling the temperature of the bath within the melting tank;
 c. a fourth control loop for providing full authority energy ratio control between the first and second control loops; and
 d. a fifth control loop for providing limited authority energy ratio control between the first and second control loops.

These five control loops are utilized in several combinations to produce four alternate modes of furnace control, namely:
 1. Power Ratio Control; utilizing the first and second control loops.
 2. Limited Authority Temperature Control; utilizing the first, second and third control loops.
 3. Limited Authority Temperature Control—Full Authority Power Ratio Control; utilizing the first, second, third and fourth control loops.
 4. Limited Authority Temperature Control—Limited Authority Power Ratio Control; utilizing the first, second, third and fifth control loops.

While the five control loops generally are formed from combinations of well-known components, the third and fifth control loops include novel adjustable first and second modifier means, respectively, with the function of these modifier means becoming apparent as the description proceeds.

BRIEF DESCRIPTION OF THE DRAWINGS

FIG. 1 is a vertical sectional view of an electric melting tank or furnace for the control of which one embodiment of the control systems of this invention may be utilized.

FIG. 2 is a view similar to that of FIG. 1 and illustrates the tank in the process of melting a batch of material.

FIG. 3 is a sectional view taken on line 3—3 of FIG. 1 and illustrates a first power control loop for controlling a first set of electrodes.

FIG. 6 is a power ratio control loop that may be utilized with the control loops shown in FIGS. 3 and 4.

FIG. 7 is a limited authority power ratio control loop that may be utilized with the control loops shown in FIGS. 3 and 4.

DESRIPTION OF THE PREFERRED EMBODIMENTS

Figure 4:
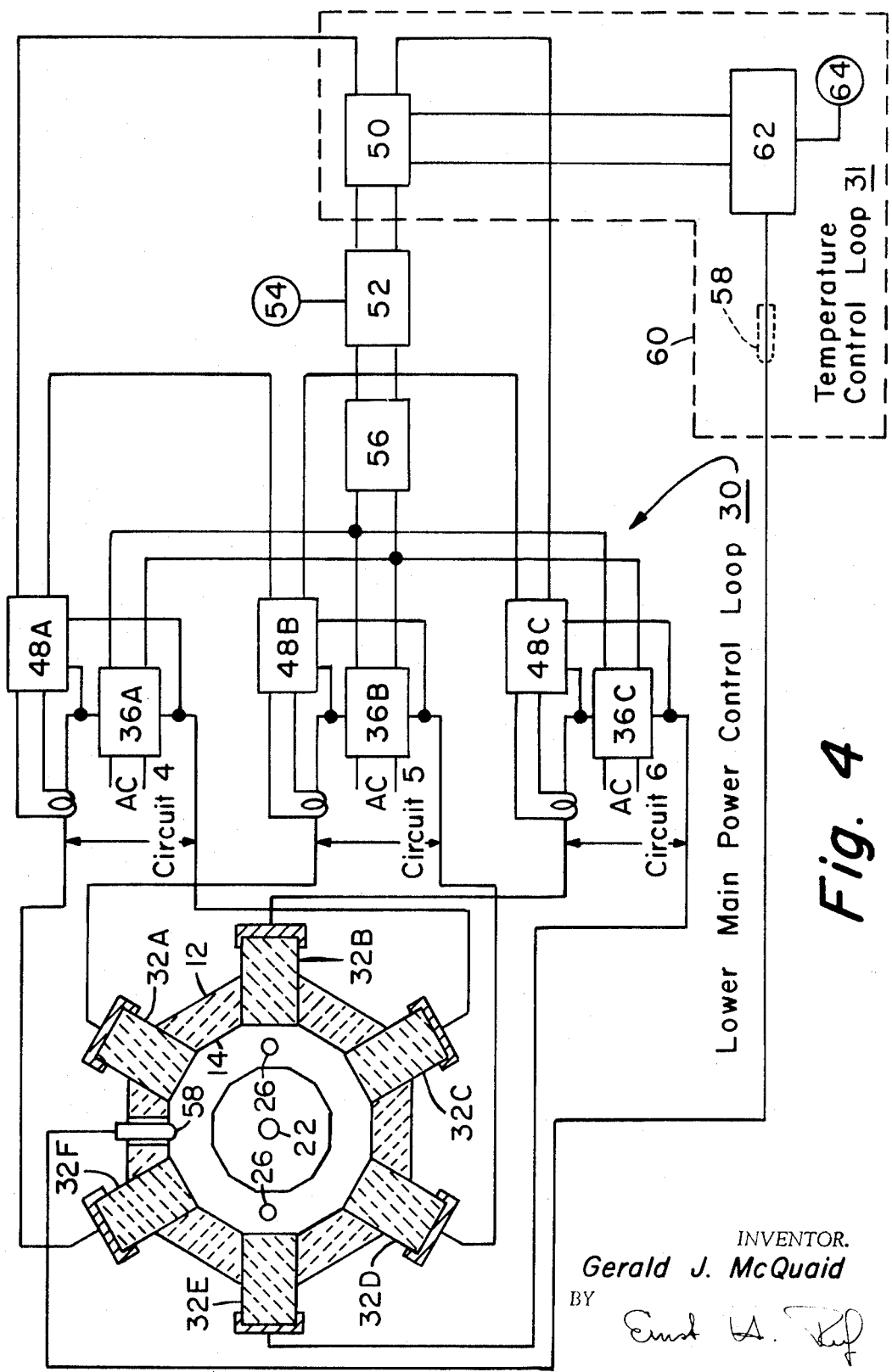
FIG. 4 is a sectional view taken on line 4—4 of FIG. 1 and illustrates both a power control loop for controlling a second set of electrodes, and a temperature control loop.

Referring now to the drawings in detail, FIG. 1 is a vertical sectional view of one type of an electric melting tank or furnace 10 for the control of which the automatic control systems of this invention may be utilized. Furnace or tank 10 comprises a vertical container 12 formed of conventional refractory materials and has an inner sidewall 14 which in horizontal cross section (see FIG. 3) forms a multisided polygon, thus approximating the configuration of a cylinder. Batch is fed into furnace 10 through the open top of the furnace by means of a batch feeder 16, which may be simply a perforate container having means for agitating the batch. As best seen in FIG. 2, the batch forms a batch cover 18 completely covering the bath of molten glass 20. The batch is preferably continuously fed into furnace 10, and molten glass 20 is preferably continuously withdrawn through an outlet 22 in the center of the bottom wall of the furnace. Outlet 22 is formed in a raised central bottom portion of the furnace, thus forming an annular depression 24 around the periphery of the bottom wall of the furnace, which acts as a sump and has drains 26 extending therethrough.

As shown in FIG. 2, but not restricted thereto, the direction of flow of material from the raw batch state, i.e., batch cover 18, to the refined molten glass state, i.e., molten glass 20, is vertical. Energy, in the form of heat, is applied in the melting process electrically by means of 12 glass contact electrodes arranged in six circuit pairs; three circuit pairs each, at two vertical levels or positions, as illustrated in FIGS. 1–4. Hereinafter the electrodes at these two levels will be referred to as upper mains and lower mains. Thus, the upper mains (FIGS. 1 and 3) comprise six electrodes 28A–28F equally spaced around the periphery of furnace 10. The lower mains (FIGS. 1 and 4) similarly comprise six electrodes 32A–32F also equally spaced around the periphery of furnace 10 and vertically aligned with electrodes 28A–28F.

Electric power may be supplied to the respective electrodes in the manner illustrated in FIG. 3 with regard to the upper main electrodes. Electrodes 28A–28F are supplied with power by means of power units 34A–34C connected to a three-phase AC source in a conventional manner, with respective phases being connected to opposite pairs of electrodes. Thus, opposite electrode pairs 28C, 28F; 28A, 28D and 28B, 28E make up Upper Main Circuits 1, 2, 3 respectively, and are hooked up to power units 34A–34C respectively, each of which may consist of a type SIHR–12 reactor transformer package manufactured by Hevi-Duty Electric Company of Madison, Wisconsin.

FIG. 4 shows the electric power hookup for the lower main electrodes to be similar to that of FIG. 3. Electrodes 32A–32F are supplied with power by means of power units 36A–36C connected to a three-phase AC source, with opposite electrode pairs 32C, 32F; 32A, 32D and 32B, 32E making up Lower Main Circuits 4, 5, 6 respectively. Circuits 4, 5, 6 are hooked up to power units 36A–36C respectively, which are substantially similar to previously described power units 34A–34C.

Prior to describing the automatic control systems of this invention, it should be noted that the following operating parameters affect tank performance;
 1. Total Energy level—The total energy requirements of tank 10 are dictated by the composition of glass 20 being melted, the glass throughput rate and steady-state energy losses incurred through the walls of container 12, bottom 24 and batch cover 18.
 2. Energy distribution—The distribution of energy within tank 10 will affect performance because of its influence on internal glass convection roll patterns, residence time and energy losses as influenced by the state of batch cover 18.
 3. Temperature—The absolute level of temperature in that region of tank 10 where refining glass 20 occurs affects performance in terms of seed count.

The control strategy for tank 10 may be defined as follows: Total energy level (as defined above) as well as energy distribution (as defined above) are controlled by means of the control loops shown in FIGS. 3 and 4. FIG. 3 shows upper main power control loop 25 while FIG. 4 shows both lower main power control loop 30 and temperature control loop 31. With reference to FIG. 3, the power applied, via power units 34A–34C, to each of circuits 1 to 3, comprised of upper main electrodes 28A–28F, is sensed by means of a suitable power transducer or sensor 38A–38C respectively, such as a Hall effect device. Sensors 38A–38C are well known and each may be a watt transducer, such as model WT5C5 watt transducer sold under the Halltiplier trademark by Scientific Columbus Inc. of Columbus, Ohio. The total power applied to circuits 1 to 3 is sensed by connecting the outputs of power transducers 38A–38C in series and thus a signal is thereupon applied to a conventional industrial three-mode controller 40 as the measured variable. Controller 40, which may be a Model 152 Controller Manufactured by Bruce Industrial Controls Inc. of Jamison, Pennsylvania, compares this signal (proportional to measured total upper main power) to the desired power level entered on controller 40 by means of its set-point dial 42. Thereafter, controller 40 manipulates the three power supplies 34A–34C through a power amplifier 44, thus driving circuits 1 to 3 (as shown in FIG. 3) together to hold the total power applied to upper main electrodes 28A–28F constant. Amplifier 44 may consist of a Bruce 300 Series Power Controller manufactured by Bruce Industrial Controls, Inc. of Jamison, Pennsylvania, and shown on Bruce Data Sheet 300AG. Thus, power units 34A–34C together with Sensors 38A–38C, controller 40 and amplifier 44 comprises upper main power control loop 25.

With reference to FIG. 4, the total power applied, via power units 36A–36C, to each of circuits 4 to 6, comprised of lower main electrodes 32A–32F, is sensed by means of suitable power transducer or sensor 48A–48C respectively. Sensors 48A–48C are substantially similar to previously described sensors 38A–38C. The total power applied to circuits 4 to 6 is sensed by connecting the outputs of power transducers 48A–48C in series and thus a signal proportional to the total lower main power is obtained. Up to this point the power control loop of FIG. 4 is substantially identical to that of FIG. 3. However, the signal proportional to total power in the lower main circuits is fed through a special modifier device 50 before it is connected to an automatic controller 52 for the purpose of control of the lower main electrode power level. (Modifier device 50 will be discussed in more detail hereinafter.) Controller 52 which is substantially similar to previously described controller 40, compares the output signal of modifier device 50 to the desired power level entered on controller 52 by means of its set-point dial 54. Thereafter, controller 52 manipulates the three power supplies 36A–36C through power amplifier 56, thus driving circuits 4 to 6 (as shown in FIG. 4). Amplifier 56 is substantially similar to previously described amplifier 44. Thus, power units 36A–36C together with sensors 48A–48C, controller 52 and amplifier 56 comprise the lower main power control loop 30, which is substantially similar to upper main power control loop 25 shown in FIG. 3. Therefore, automatic power control loops 25 and 30 shown in FIGS. 3 and 4 respectively, provide the means for control of both energy level and energy distribution.

The ratio of the two set-point values (as set on dials 42 and 54 in control loops 25 and 30 respectively) defines a target or desired power ratio, i.e., the ratio of upper main power to lower main power, which is selected to give the desired energy distribution for the glass being melted and the tank being used. The sum of the set-point values (set on dials 42 and 54) defines the total power level which is selected to satisfy the throughput and energy loss requirements for the glass being melted and the tank being used.

Control of temperature is implemented by means of modifier device 50, which is connected to lower main power control loop 30. Temperature in a lower area of tank 10, where refining occurs, is sensed by means of thermocouple 58 inserted into glass 20 through the tank wall (FIGS. 1, 4). The output of thermocouple 58 (a signal proportional to the glass temperature at inner sidewall 14) is fed to a precision industrial process or temperature controller 62 as the measured variable. Temperature controller 62 may be made up of the combination of Model 101 Precision Setpoint Amplifier and Model 201 Current Output Controller, both of which are manufactured by Bruce Industrial Controls, Inc. in Jamison, Pennsylvania, and described in Bruce Data Sheets 100AB and 200AA, respectively. The thermocouple output is compared by controller 62 to a desired temperature level entered into controller 62 by means of its set-point dial 64. The output of temperature controller 62 is connected to modifier device 50 which in turn is connected to controller 52 in lower main control loop 30. Thus, thermocouple 58 with controller 62 and modifier device 50 together comprise the temperature control loop 31. To avoid any possible confusion between control loops 30 and 31, the latter is shown within broken-line block 60. For ease of illustration, a dashed-line version of thermocouple 58, which is actually located in tank 10, is also shown within block 60.

The function of modifier device 50 is to modify the signal proportional to the measured power in lower main electrode circuits 4 to 6 in such a way that the power in these circuits will be automatically adjusted in such a manner that glass temperature as measured by thermocouple 58 will be held equal to the set-point value entered on dial 64 of temperature controller 62. Modifier device 50 is adjustable, with regard to the maximum change of the amount of power applied to the lower mains, to hold the temperature of molten glass 20 equal to the desired temperature level entered into controller 62.

Figure 5:
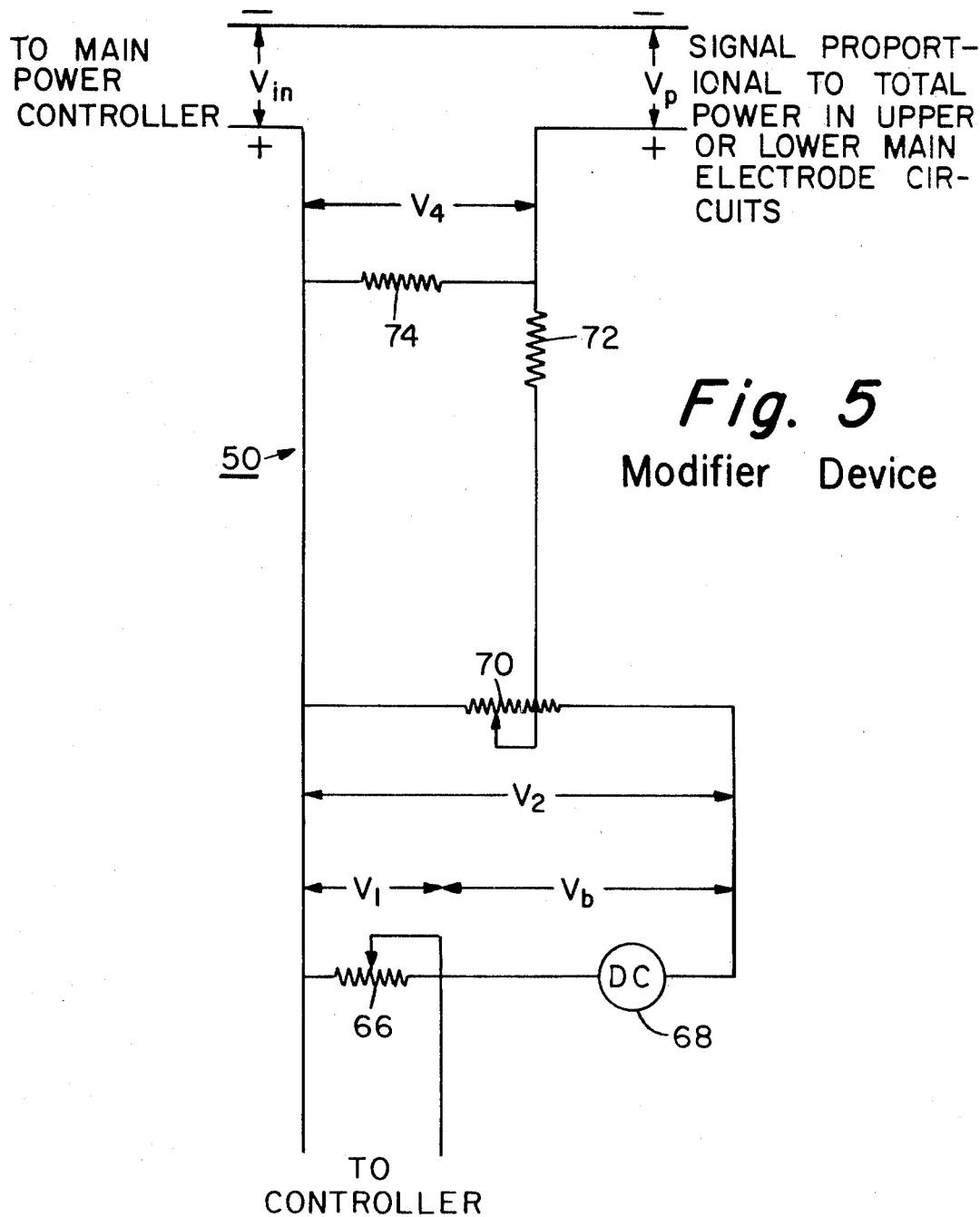
FIG. 5 is a circuit diagram of the modifier device used in the control loop shown in FIG. 4 and 7.

The circuit diagram of modifier device 50 is shown in FIG. 5. A potentiometer 66 converts the electrical current output signal of temperature controller 62 to a voltage signal. A DC power source 68 (either a battery or a power supply) is connected in series with potentiometer 66 but with opposed polarity, i.e., positive to positive. Potentiometer 66 is adjusted so that when the output of temperature controller 62 is at its maximum value, the voltage $V_1$ across potentiometer 66 is exactly twice the voltage $V_b$ of DC power source 68. Therefore, when the output of temperature controller 62 is at its maximum, the voltage $V_2$ will be $+V_b$, and when the output of controller 62 is zero, the voltage $V_2$ will be $-V_b$. Temperature controller 62 is selected to be reverse acting so that $V_2=+V_b$ corresponds to an undertemperature condition, while $V_2=-V_b$ corresponds to an overtemperature condition. A variable voltage divider or potentiometer 70 and a fixed voltage divider formed by resistors 72 and 74 reduce $V_2$ to $V_4$, which is at a signal level compatible with that of power sensors 48A–48C (FIG. 4).

Voltage $V_4$ is connected in series and in opposing polarity with the voltage signal $V_p$ (proportional to the total power in lower main electrode circuits 4 to 6) and the sum voltage is applied to lower main power controller 52 as the sensed variable $V_{in}$. Therefore:

$$V_{in}=V_p-V_4$$

In an undertemperature condition, $V_4$ will become positive and $V_{in}$ will become less than $V_p$. Since lower main power controller 52 operates to maintain $V_p$ equal to a set-point value (set on dial 54), the "apparent" reduction in $V_p$ caused by actually reducing $V_{in}$ will cause controller 52 to increase the power level in lower main circuits 4 to 6 until $V_{in}$ equals the set-point value (on dial 54), and this will be in the proper direction to correct for an undertemperature condition. An overtemperature condition would cause the opposite result by adding to $V_p$ so that $V_{in}$ would become greater than the set-point value (on dial 54) and the lower main power level would be reduced. Voltage $V_4$ can be calibrated in equivalent kilowatts change for lower main circuits 4 to 6 by virtue of the system scaling. Manipulation of potentiometer 70 allows the maximum values which $v_4$ can assume to be varied. This directly varies the "authority" of temperature control loop 31 over the lower main power control loop 30. Upon selection of the authority, i.e., the setting of potentiometer 70, a comprise between temperature control and energy distribution (power control), is affected. For very wide authority, temperature control can be maintained even in the face of large upsets, but only at the sacrifice of power ratio control. For very narrow authority, power ratio control is maintained, but the ability to maintain temperature control in the face of significant upsets is impaired.

It should be noted that the average value of voltage $V_4$ (FIG. 5) will not necessarily always be zero. In practice, however, the set-point value (on dial 54) of lower main power controller 52 can be manually trimmed or reset until voltage $V_4$ is near zero so that temperature control loop 31 will be in a position to respond with equal authority to either an overtemperature or undertemperature upset. The upper set-point value (on dial 42) of upper main power controller 40 is then selected to give the desired average power ratio.

In cases where the "average" power ratio control is inadequate, continuous power ratio control can be implemented by using the device illustrated in FIG. 6. The power ratio control loop 75 of FIG. 6 augments the upper main power controller 40 and upper main power amplifier 44 of the upper main power control loop 25 as shown in FIG. 3. In FIG. 6, a signal proportional to the total lower main power $V_{pl}$ is fed to a potentiometer 76, while a signal proportional to the total upper main power $V_{pu}$ is fed to a potentiometer 78. The outputs of potentiometer 76 and 78, namely voltages $V'$ and $V''$ *are proportional to the lower main and upper main power levels respectively*: $V'=CP_1$; $V''=KP_u$. If $V'$ and $V''$ are different, the error $V_e$, is amplified by a DC amplifier 80, and through upper main controller 40 and upper main power amplifier 44 drives upper main power units 34A–C until $V_e=0$, i.e., $V'=V''$. At this point, then:

$$CP_1=KP_u \text{ or } P_u/P_1=C/K = \text{Constant}$$

Therefore, the desired power ratio can be selected by selecting values for the proportionality constants $C$ and $K$, which, in fact, are merely settings for potentiometers 76 and 78 respectively. Amplifier 80 may consist of Dynamics Model 6451 Differential DC Amplifier manufactured by Dynamics Instrumentation Company of Monterey Park, California. It should be realized of course that other equipment implementations, in addition to power ratio control loop 75, which comprises the combination of potentiometers 76, 78 and DC amplifier 80, are also possible for the manipulation of upper main circuits 1 to 3, in order to hold the power ratio constant.

If continuous power ratio control is implemented, then total power level control, that is, total energy level control, is obviously sacrificed. A compromise between power ratio control and power level control can be effected by modifying the same basic power ratio control technique (as described above and shown in FIG. 6) for a limited authority power ratio control. This approach is illustrated in FIG. 7 and again, as with power ratio control loop 75 of FIG. 6, augments the upper main power controller 40 and upper main power amplifier 44 of upper main power control loop 25 (FIG. 3). Looking at it in another way, limited authority power ratio control loop 82 of FIG. 7 is comprised of control loop 75 of FIG. 6 with the addition and interposition of controller 84 (with its set-point dial 86) and modifier device 50A between DC amplifier 80 and upper main controller 40 of upper main control loop 25. (Controller 84 is substantially similar to previously described controller 40.) Upper main power units 34A–34C are manipulated in order to hold the power ratio constant by means of modifier device 50A, which is substantially similar to modifier device 50 previously described and shown in circuit diagram form in FIG. 5. Modifier device 50A manipulates the signal proportional to upper main power ($V_{pu}$) in such a way so as to cause upper main power units 34A–34C to drive in a direction to hold the power ratio constant. Modifier device 50A is adjustable, with regard to the maximum change of the amount of power applied to the upper electrodes, to hold the power ratio entered on controller 84 at the desired level. In this mode of control, power ratio controller 84, having its set-point value set on zero (on dial 86), still operates so as to drive error signal $V_e$ to zero and as noted previously, this corresponds to the equality:

$$CP_1=KP_u$$
$$P_u/P_1=C/K = \text{Constant}$$

However, instead of manipulating upper main power units 34A–34C directly, power ratio controller 84 works through modifier 50A. The signal proportional to the upper main total power $V_{pu}$ is now "modified" by subtracting voltage $V_4$ before it is fed to upper main power controller 40. (The voltage $V_4$ is developed in the manner described with reference to FIG. 5.) In a situation where the power ratio is less than the desired value, a positive voltage $V_4$ is developed so that $V_{in}$ is reduced according to $$V_{in}=V_{pu}-V_4$$

This causes $V_{pu}$ to be raised above the set-point value (on dial 42) as required to reach the desired power ratio. If the power ratio is above the desired value, a negative voltage $V_4$ is developed so that as $V_{in}$ is increased, upper main power is reduced and the power ratio is reduced to the desired level. The "authority," that is the maximum upper main power change which can be made to hold the power ratio at the desired level, is adjustable by means of the variable resistor 70. This adjustment in fact selects how big a voltage $V_4$ is developed for the full span swing of power ratio controller 84.

In summary, four alternate modes of control are possible:

1. Power Ratio Control—This first mode of Control utilizes control loops 25, 30. Total power applied to tank 10 is:
$$P_T=P_u+P_1$$
Power ratio is:
$$R=P_u/P_1$$
where
   $P_T=$ total power applied to tank 10.
   $P_u=$ set point value for upper main power controller 40.
   $P_1=$ set-point value for lower main power controller 52.
   $Pb'=$ the authority of temperature control loop 31 over lower main power control loop 30 expressed in power units.

2. Limited Authority Temperature Control—This second mode of control utilizes control loops 25, 30, 31. Total power applied to tank 10 is:
$$P_T=P_u+P_1\pm Pb'$$
The power ratio is:
$$R=P_u/P_1\pm Pb'$$

3. Limited Authority Temperature Control—Full Authority Power Ratio Control. This third mode of control utilizes control loops 25, 30, 31, 75 Total power applied to tank 10 is:
$$P_T=P_1\pm Pb'+R\ (P_1\pm Pb')$$
$$=(1+R)\ (P_1\pm Pb')$$
The power ratio is constant and equal to $R$.

4. Limited Authority Temperature Control—Limited Authority Power Ratio Control—This fourth mode of control utilizes control loops 25, 30, 31, 82. Total power applied to tank 10 is:
$$P_T=P_1\pm Pb'+P_u\pm Pb''$$
where $Pb''=$ the authority of power ratio control loop 82 over the lower main power control loop 30 expressed in power units.
The power ratio is:
$$R=(P_u\pm Pb'')/(P_1\pm Pb')$$

This invention has been described with reference to a vertical glass melting tank or furnace but is not restricted thereto. The previously described upper and lower mains are equivalent to the rear and front mains of a horizontal-type melting furnace where batch or raw material is added at the rear and molten glass is withdrawn at the front. The four alternate modes of control and their associated control loops, as previously described, may thus also be utilized in a horizontal type of electrically heated (cold crown) furnace. In addition, these modes of control may also be utilized in a horizontal furnace heated by a combination of flame and electrical heat, i.e., an electrically boosted flame fired furnace, when the furnace crown temperature (hot crown-flame fired) is held constant.

While the invention has been described in connection with possible forms or embodiments thereof, it is to be understood that the present disclosure is illustrative rather than restrictive and that changes or modifications may be resorted to without departing from the spirit of invention or scope of the claims which follow.

I claim:

1. A system for concurrently controlling both the level and distribution of the energy supplied to, as well as the temperature within, a melting tank or furnace containing a bath of molten material, such system comprising:
    a. first and second means for supplying energy to first and second positions respectively, of said bath within said melting tank;
    b. first and second control loops for controlling both the level and distribution of energy supplied to said first and second energy supplying means, respectively; and
    c. a third control loop, operating in conjunction with said second control loop, for controlling the temperature of said bath within said melting tank.

2. The control system of claim 1 with the addition of a further control loop, operating in conjunction with said first and second control loops, for controlling the energy ratio between said first and second control loops.

3. The control system of claim 2 wherein:
    a. said first and second energy supplying means comprising first and second sets of electrodes, with each set including multiple first and second circuits of said electrodes;
    b. said first and second control loops comprising:
        $b_1$. at least one first and second power supply for each of said first and second circuits, respectively;
        $b_2$. first and second sensing means for sensing the amount of power applied to each of said multiple first and second circuits, respectively, with the total amount of power applied to said multiple first and second circuits, respectively, providing first and second signals proportional to the total power applied to said first and second sets of electrodes, respectively;
        $b_3$. first and second controllers, having adjustable first and second set-point means, respectively, for comparing said first and second signals, respectively, with the desired power levels entered on said first and second set-point means, respectively; and
        $b_4$. first and second power amplifiers through which said first and second controllers, respectively, manipulate said multiple first and second power supplies, respectively, said first power amplifier thereby driving said multiple first circuits together, to hold the total level of power applied to said first set of electrodes constant, said second power amplifier thereby driving said multiple second circuits together to hold the total level of power applied to said second set of electrodes constant, with the ratio of said first and second set-point levels defining a desired power ratio which is selected to provide the desired energy distribution for the material being melted and the melting tank being used.

4. The control system of claim 3 wherein said third control loop comprises:
    a. third sensing means for sensing the actual temperature within said melting tank and producing a third signal proportional to said actual temperature;
    b. a third controller, having an adjustable third set-point means, for comparing said third signal to the desired temperature level entered on said third set-point means; and
    c. adjustable first modifier means, which is also connected to said second control loop, receiving one input from said second sensing means and another input from said third controller, and having its output connected to said second controller, for modifying said second signal in a manner so that the total level of the power applied to said second set of electrodes by said second power supplies will be automatically adjusted in such a manner that the actual temperature of said bath of molten material, as measured by said third sensing means, will be held equal to the desired temperature level entered on said third set-point means, said first modifier means being adjustable, with regard to the maximum desired change of the amount of power applied to said second set of electrodes, to hold the actual temperature of said bath of molten material equal to said desired temperature.

5. The control system of claim 3 wherein said further control loop, operating in conjunction with said first and second control loops, comprises a fourth control loop for providing full authority energy ratio control between said first and second control loops, said fourth control loop comprising:
    a. first adjustable means for receiving said first signal;
    b. second adjustable means for receiving said second signal, with said first and second receiving means being adjustable so that their output signals, while being proportional to said first and second signals, respectively, are equal as long as the ratio of said first and second set-point levels remains unchanged; and
    c. a first signal amplifier connected to both said first and second adjustable means as well as to said first controller, said first signal amplifier serving to amplify any error signal resulting when the output signals of said first and second adjustable means become unequal due to a change in the ratio of said first and second point levels, said error signal thereupon driving said first power supplies (through said first controller and first power amplifier) until said error signal is reduced to zero.

6. The control system of claim 3 wherein said further control loop, operating in conjunction with said first and second control loops, comprises a fifth control loop for providing limited authority energy ratio control between said first and second control loops, said fifth control loop comprising:
    a. first adjustable means for receiving said first signal;
    b. second adjustable means for receiving said second signal, with said first and second receiving means being adjustable so that their output signals, while being proportional to said first and second signals, respectively, are equal as long as the ratio of said first and second set-point levels remains unchanged;
    c. a first signal amplifier connected to both said first and second adjustable means as well as to said first controller, said first signal amplifier serving to amplify any error signal resulting when the output signals of said first and second adjustable means become unequal due to a change in the ratio of said first and second point levels;
    d. a fourth controller, having an adjustable fourth set-point means, and receiving as its input the amplified error signal from said first signal amplifier for comparing said error signal to a zero value entered on said fourth set-point means; and
    e. adjustable second modifier means, receiving one input from said fourth controller and another input in the form of said first signal and having its output connected to said first controller for modifying said first signal in a manner so that the total level of power applied to said first set of electrodes by said first power supplies (as manipulated by said first controller through said first power amplifier) will be automatically adjusted in such a manner with regard to said first set-point level as required to reach the desired power ratio, said second modifier means being adjustable with regard to the maximum change of the amount of power applied to said first set of electrodes to hold said power ratio at the desired level.

7. In combination with a first control loop for controlling both the level and distribution of the energy or power supplied to a multiple circuit first set of electrodes in a melting tank or furnace, said first control loop comprising:
    A. a first power supply for each circuit of said first set of electrodes;
    B. first sensing means for sensing the amount of power applied to each circuit, with the total amount of power applied to said multiple circuits being sensed by connecting the outputs of said sensing means in series and thereby obtaining a first signal proportional to the total power applied to said first set of electrodes;

C. a first controller, having an adjustable first set-point means, for comparing said first signal to the desired power level entered on said first set-point means; and D. a first power amplifier through which said controller manipulates said power supplies, thereby driving said multiple circuits together, to hold the total level of the power applied to said first set of electrodes constant; a second control loop operating in conjunction with said first control loop, for controlling both the level and distribution of the energy or power supplied to a multiple circuit second set of electrodes in said melting tank or furnace, said second control loop comprising:

a. a second power supply for each circuit of said second set of electrodes;

b. second sensing means for sensing the amount of power applied to each circuit with the total amount of power applied to said multiple circuits being sensed by connecting the outputs of said sensing means in series and thereby obtaining a second signal proportional to the total power applied to said second set of electrodes;

c. a second controller, having an adjustable second set-point means, for comparing said second signal to the desired power level entered on said second set-point means; and d. a second power amplifier through which said second controller manipulates said second power supplies, thereby driving said multiple circuits together, to hold the total level of the power applied to said second set of electrodes constant, with the ratio of said first and second set-point levels entered on the first and second set-point means of said first and second controllers defining a desired power ratio which is selected to provide the desired energy distribution for the material being melted and the melting tank being used.

8. The combination as in claim 7 with the addition of a third control loop, operating in conjunction with said second control loop, for controlling the temperature within said melting tank or furnace, said third control loop comprising:

a. third means for sensing the temperature within said melting tank and producing a third signal proportional to the temperature of the molten material within said melting tank;

b. a third controller, having an adjustable third set-point means, for comparing said third signal to the desired temperature level entered on said third set-point means; and c. adjustable first modifier means, receiving one input from third controller and receiving another input from said second sensing means and having its output connected to said second controller, for modifying said second signal in a manner so that the total level of power applied to said second set of electrodes by said second power supplies (as manipulated by said second controller through said second power amplifier) will be automatically adjusted in such a manner that the temperature of the molten material within said melting tank, as measured by said third means for sensing, will be held equal to the desired temperature level entered on said third set-point means of said third controller, said first modifier means being adjustable, with regard to the maximum change of the amount of power applied to said second set of electrodes, to hold the temperature of the molten material equal to said desired temperature.

9. The combination as in claim 8 further including a fourth control loop, operating in conjunction with said first and second control loops, for providing full authority power ratio control between said first and second control loops, said fourth control loop comprising:

a. a first adjustable means for receiving said first signal (proportional to measured total power applied to said first set of electrodes);

b. a second adjustable means for receiving said second signal (proportional to measured total power applied to said second set of electrodes), with said first and second receiving means being adjustable so that the output signals, while being proportional to said first and second signals, are equal as long as the ratio of said first and second set-point values remains unchanged; and c. a first signal amplifier connected to both said first and second adjustable means and connected to the first controller of said first control loop, said first signal amplifier serving to amplify any error signal resulting when the output signals of said first and second adjustable means become unequal due to a change in the ratio of said first and second set-point values, said error signal thereupon driving said first power supplies (through said first controller and first power amplifier) until said error signal is reduced to zero 10. The combination as in claim 8 further including a fifth control loop, operating in conjunction with said first and second control loops, for providing limited authority power ratio control between said first and second control loops, said fifth control loop comprising;

a. first adjustable means for receiving said first signal (proportional to measured total power applied to said first set of electrodes);

b. second adjustable means for receiving said second signal (proportional to measured total power applied to said second set of electrodes); with said first and second adjustable means being adjustable so that their output signals while being proportional to said first and second signals are equal as long as the ratio of said first and second set-point values remains unchanged;

c. a first signal amplifier connected to both said first and second adjustable means said first signal amplifier serving to amplify any error signal resulting when the output signals of said first and second adjustable means become unequal due to a change in the ratio of said first and second set-point values;

d. a fourth controller, having an adjustable fourth set-point means, and receiving as its input the amplified error signal from said first signal amplifier, for comparing said error signal to a zero value entered on said fourth set-point means; and e. adjustable second modifier means, receiving one input form said fourth controller and another input in the form of said first signal and having its output connected to said first controller of said first control loop, for modifying said first signal in a manner so that the total level of power applied to said first set of electrodes by said first power supplies (as manipulated by said first controller through said first power amplifier) will be automatically adjusted in such a manner with regard to said first set-point value as required to reach the desired power ratio, said second modifier means being adjustable with regard to the maximum change of the amount of power applied to the said first set of electrodes to hold said power ratio at the the desired level.

* * * * *